United States Patent [19]

Gunther

[11] 4,378,615

[45] Apr. 5, 1983

[54] FASTENER RECEPTACLE HAVING PRESS-IN MOUNTING

[75] Inventor: Conrad J. Gunther, Uniondale, N.Y.

[73] Assignee: Dzus Fastener Co., Inc., West Islip, N.Y.

[21] Appl. No.: 251,186

[22] Filed: Apr. 6, 1981

[51] Int. Cl.³ .............................................. A44B 17/00
[52] U.S. Cl. .................................................. 24/221 A
[58] Field of Search ........................... 24/221 A, 221 R

[56] References Cited

U.S. PATENT DOCUMENTS 2,527,408  10/1950  Dzus ................................... 24/221 A
2,887,753   5/1959  Ralph et al. ....................... 24/221 A Primary Examiner—Robert Peshock
Attorney, Agent, or Firm—Kane, Dalsimer, Kane, Sullivan and Kurucz

[57] ABSTRACT

An improved fastener receptacle of the press-in type for use with a spiral cam slot type fastener stud and which is useful in providing protection against dust, weather and radio-frequency leakage. The receptacle includes a casing having a cylindrical side wall formed with a serrated toothed shoulder and a groove and rib immediately adjacent thereto providing a self-clinching press-in mounting at the inner end of the cylindrical wall and with diametrically opposite longitudinal slots near the outer end and having a sealing cap enclosing the outer end of the cylindrical wall and longitudinal slots. A locking bar is disposed diametrically within the cylindrical wall with its opposite ends disposed in the slots and is normally urged towards the outer end thereof by means of a helical spring whereby the locking bar may shift inwardly against the force exerted by the spring when it is engaged by the spiral cam slot of a fastener stud.

6 Claims, 13 Drawing Figures

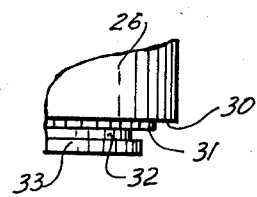
FIG. IA
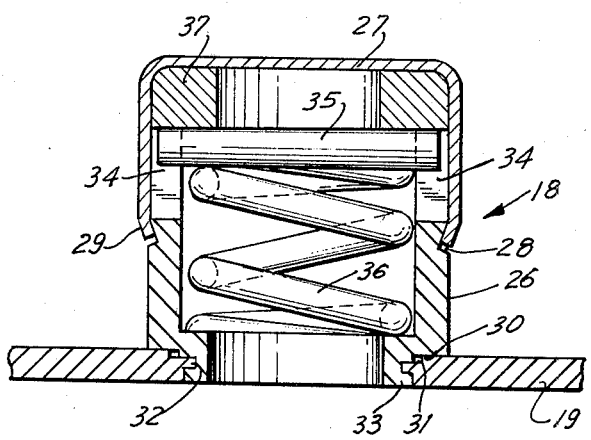
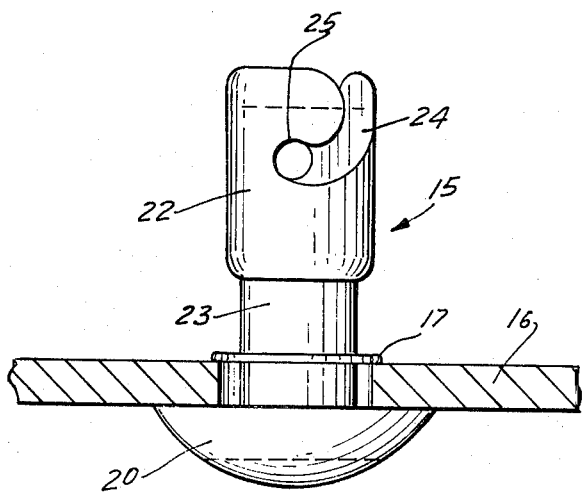
FIG. 2

FASTENER RECEPTACLE HAVING PRESS-IN MOUNTING

BACKGROUND OF THE INVENTION

Quick release fasteners of the spiral cam type are well known and have been in use for many years. These fasteners generally consist of a fastener stud having a head with a dependent shank having a spiral slot extending inwardly from the outer end thereof and terminating in a locking shoulder. Upon rotation, usually through a quarter turn, a fastener stud can be interengaged with a spring or receptacle. Fasteners of this type are disclosed in U.S. Pat. No. 1,955,740 dated Apr. 24, 1934. Various types of receptacles having locking bars or springs for interengagement with the stud and disposed within a casing have been provided in the past, as shown for instance in U.S. Pat. No. 2,337,457 of Dec. 21, 1943, U.S. Pat. No. 2,347,675 of May 2, 1944, U.S. Pat. No. 2,424,603 of July 29, 1947 (U.S. Pat. No. Re 24,028), U.S. Pat. No. 2,527,408 of Oct. 24, 1950, U.S. Pat. No. 2,547,155 of Apr. 3, 1951 and U.S. Pat. No. 4,227,287 of Oct. 14, 1980.

For our present purposes, these fastener receptacles provided one or more disadvantages. Thus, some of them require riveting for installation, which is expensive and time consuming. Others do not have a completely sealed enclosure and accordingly do not provide protection against dust, weather and radiofrequency leakage; while still others require considerable space for installing on a supporting member to be secured by the fastener.

For many purposes, it is desirable to have an improved receptacle for a quick release fastener of the spiral cam type which is simple to install, occupies a minimum of space and which provides protection against dust and weather and minimizes radiofrequency leakage.

SUMMARY OF THE INVENTION

It is a primary object of the present invention to provide a fastener receptacle for a quick release fastener of the spiral cam type which will fulfill the functions indicated above in that it is simple to install, occupies a minimum of space and provides an enclosed protection against dust and weather and which minimizes radiofrequency leakage.

These and other objects are accomplished by means of my improved fastener receptacle having an enclosing casing with a cylindrical side wall provided with a self-clinching press-in mounting at the lower end thereof with diametrically disposed longitudinal slots near the upper end thereof with a sealing cap enclosing the outer end of the cylindrical wall and overlapping the longitudinal slots. A locking pin extends diametrically across the cylindrical wall with its ends disposed in the slots and a helical spring within the casing extends between a shoulder in the lower portion of the casing and the locking pin to normally press the pin towards the outer end of the slots whereby the pin may shift downwardly in the slots against the force exerted by the spring when the pin is engaged by the spiral cam slot of a fastener stud.

BRIEF DESCRIPTION OF THE DRAWINGS

In the accompanying drawings:

FIG. 1 (a) is a detailed view of a portion of the lower end of the receptacle of FIG. 1 illustrating the self-clinching press-in mounting;

FIG. 2 is an elevational view, partially in section, of a spiral cam fastener stud mounted on a removable panel and of the assembled receptacle of the type shown in FIG. 1 mounted on a support with the stud and receptacle disengaged;

DETAILED DESCRIPTION

Figure 1:
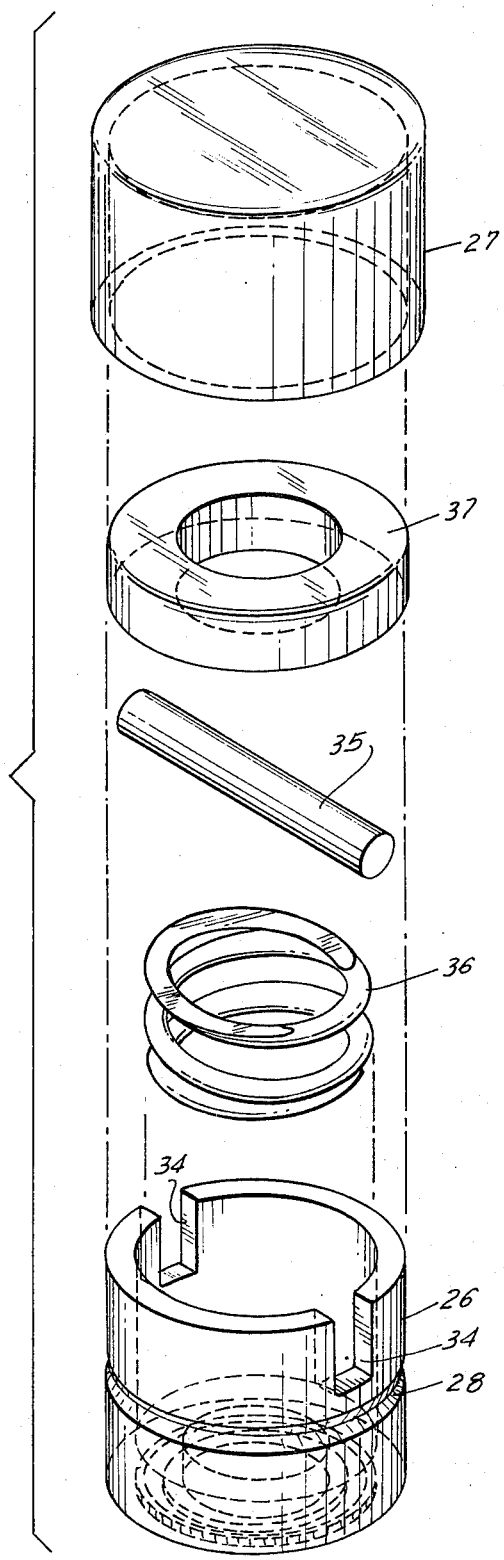
FIG. 1 is an exploded view of one preferred form of fastener receptacle embodying my invention.

Referring to the first preferred form of my invention, the quick release spiral cam slot fastener comprises a stud member 15 suitably mounted in an aperture in a panel 16 by suitable means, such as snap ring 17, and a receptacle 18 fixedly mounted in an aperture in a support 19. The stud and receptacle can be engaged and locked in the manner shown in FIGS. 3 and 4 by inserting the end of the stud through the aperture in the support into the receptacle and rotating the stud in a clockwise direction for one quarter turn and can be released by rotating the stud in a counterclockwise direction for one quarter turn. The stud 15 is of well known construction and consists of a head portion 20 which may have a screwdriver slot or kerf formed therein and having a dependent shank portion 22 with a restricted neck portion 23 around which the snap ring 17 is assembled after the stud is inserted through the aperture in the removable panel 16. Thus, the stud may rotate in the panel but is held assembled therewith by means of the snap ring. The outer end portion of the shank 22 is of tubular construction and a pair of diametrically opposed spiral slots 24 are formed therein terminating in locking cams.

As stated above, the spiral cam fastener stud is of well known construction and persons skilled in the fastener art are familiar therewith.

Referring now to the first preferred form of my improved receptacle, it will be seen that the receptacle comprises a casing comprising a cylindrical wall portion 26 and a cap portion 27 in sealed engagement with each other. For this purpose a groove 28 is formed around the outside of the cylindrical wall portion near the center thereof and the cap is assembled over the top of the wall portion and the lower end thereof is rolled or clinched into the groove 28 as shown at 29. As shown in FIG. 1 (a), a shoulder 30 is formed near the lower end of the cylindrical wall 26 and a toothed ring 31 is formed around the lower portion of the shoulder with a groove 32 and rib 33 formed immediately beneath the toothed ring at the lower end of the cylindrical wall providing a self-clinching press-in mounting for the receptacle. Longitudinally extending slots 34 extend inwardly from the outer end of the cylindrical wall on diametrically opposite sides thereof.

A locking pin or bar 35 is extended diametrically across the cylindrical wall with the ends thereof positioned and slidable in the slots 34. The locking pin or bar is normally urged towards the outer ends of the slots by means of a helical spring 36 disposed inside the casing and extending between the inner portion of the shoulder and the locking pin. A spacing ring 37 is positioned on the outer end of the circular wall closing the outer ends of the slots 34 and providing suitable clearance between the head of the cap and the locking ring so that the outer end of the spiral cam stud has suitable clearance when rotated between locked and unlocked positions.

Figure 3:
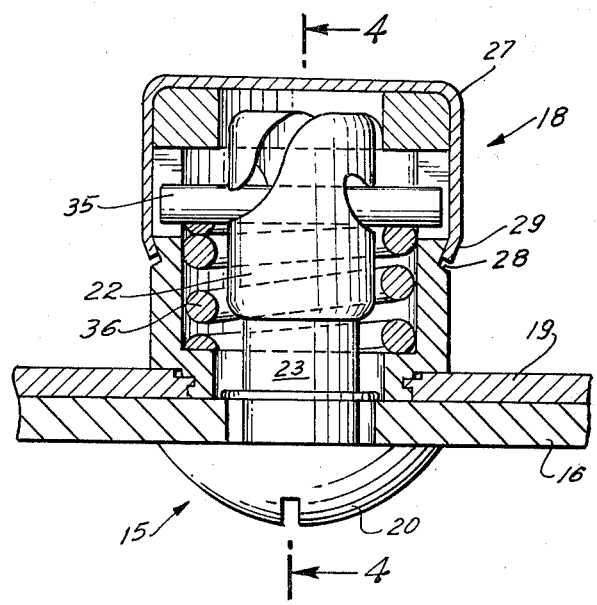
FIG. 3 is a longitudinal sectional view through the receptacle showing the stud engaged in locked position with the stud and receptacle being mounted respectively on a removable panel and support.
Figure 4:
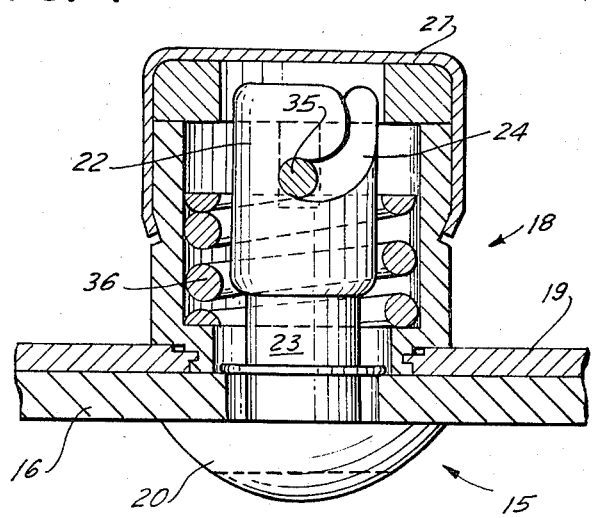
FIG. 4 is also a longitudinal sectional view of the assembled fastener stud and receptacle shown at right angles and in the direction of the arrows on the line 4—4 of FIG. 3.
Figure 5:
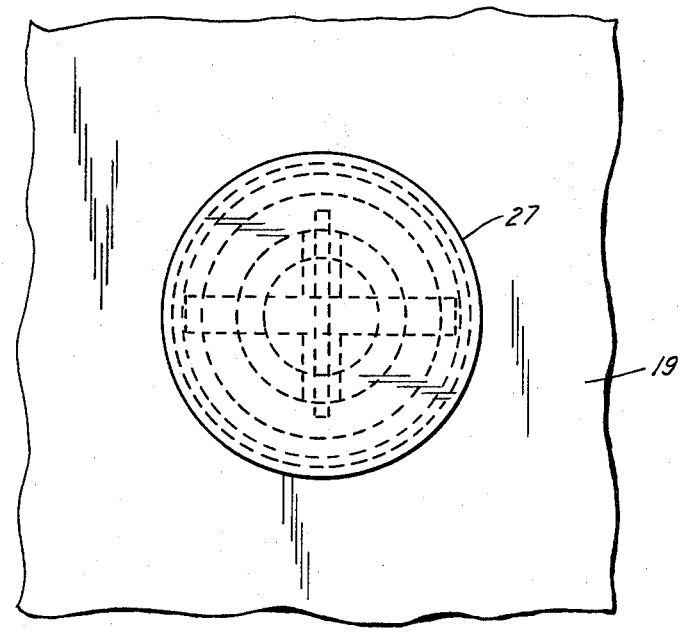
FIG. 5 is a plan view of the assembled fastener as viewed from above in FIG. 3.
Figure 6:
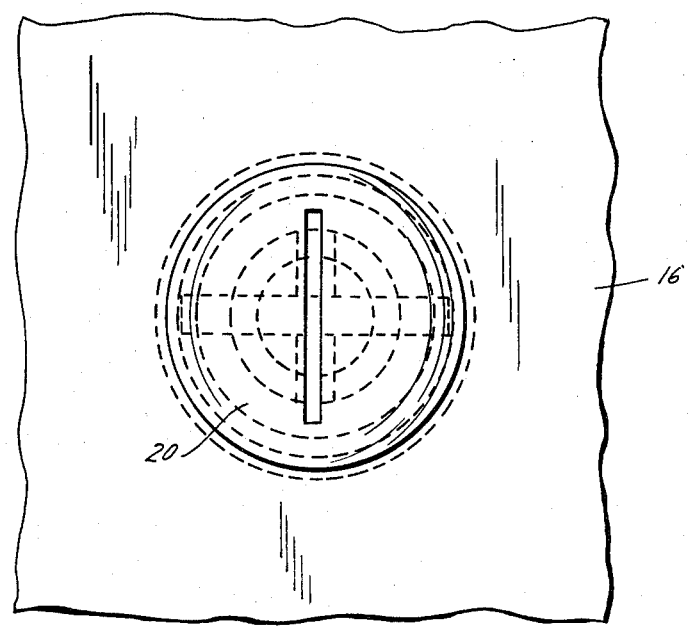
FIG. 6 is a plan view of the assembled fastener as viewed from below in FIG. 3.
Figure 7:
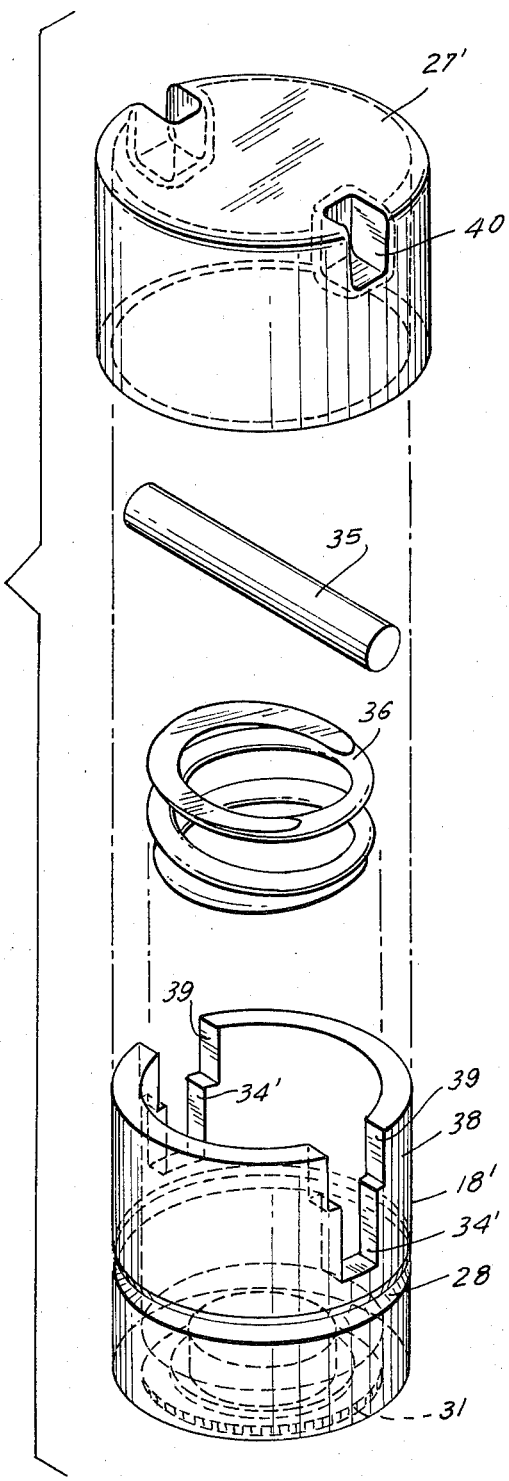
FIG. 7 is an exploded view of another preferred form of fastener receptacle embodying my invention.
Figure 8:
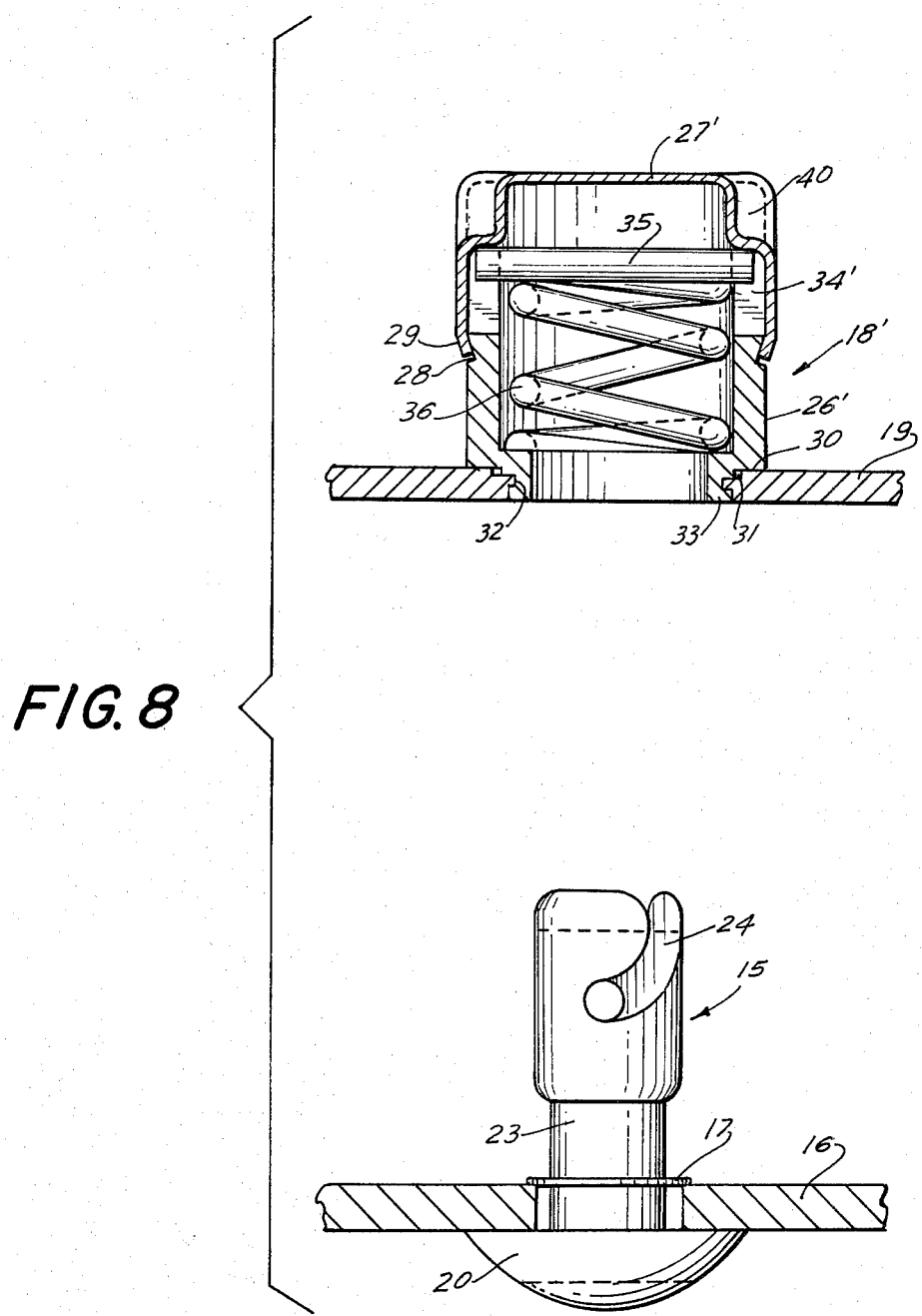
FIGS. 8, 9, 10, 11 and 12 are views similar to FIGS. 2, 3, 4, 5 and 6 but showing the modified form of fastener receptacle.
Figure 9:
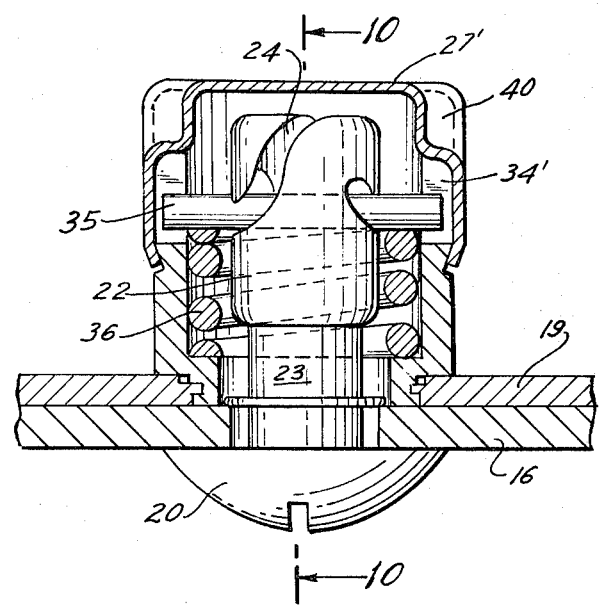
Figure 10:
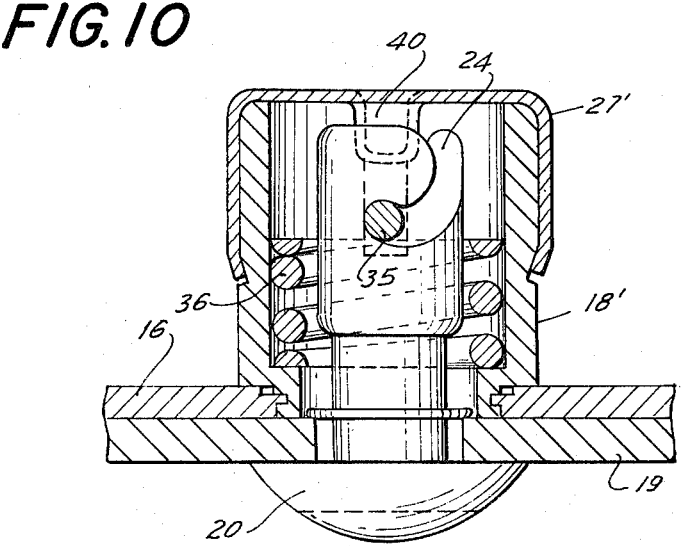
Figure 11:
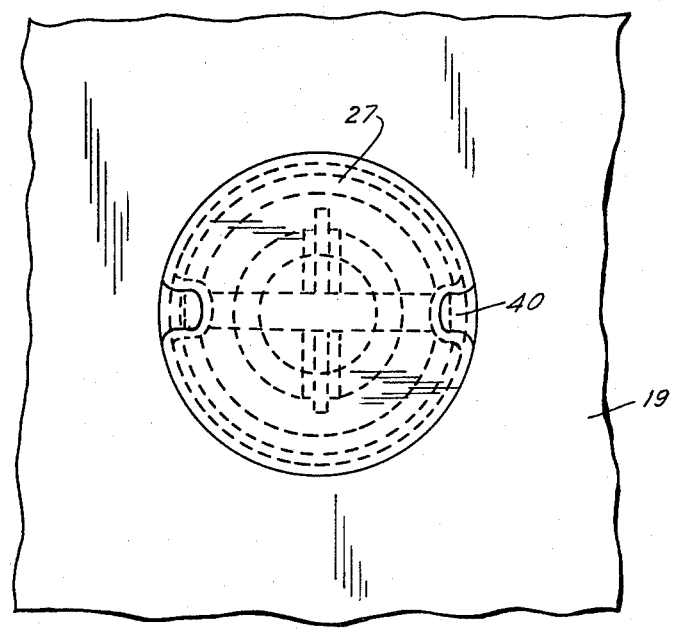

In assembling the receptacle with the support 19, an aperture is formed in the support of the approximate diameter of the rib 33. The rib 33 and groove portion 32 at the lower end of the receptacle are inserted through the aperture and a sufficient downward force is exerted on the top of the cap 27 with a backing force applied to the opposite surface of support 19 to cause the toothed clinching ring 31 to press into the upper surface of the support and offsetting the material thereof into the groove 32, as shown in FIGS. 2, 3 and 4, thereby firmly clinching the receptacle in place in the support.

The cylindrical wall and cap of the casing are preferably made of a suitable metallic material so as to not only provide protection against dust in the atmosphere but also to minimize radiofrequency leakage. For this purpose, the cylindrical wall may be made of a heat treated alloy steel which may be protected as by zinc plating and the cap may be made of stainless steel. The spacer ring may also be made of zinc plated steel and the coil spring and locking pin may be made of spring tempered stainless steel.

When the spiral cam stud and improved receptacle are assembled, as indicated with a removable panel 16 and support 19, they may be interengaged and locked by inserting the outer end of the stud through the aperture in the support into the receptacle until the spiral slot 24 engages the locking pin 35. The stud is then rotated in a clockwise direction with the result that the locking pin 35 is drawn inwardly by the spiral slots 24 until it is locked behind the locking shoulder or cam 25. The fastener may be unlocked by rotating the stud in a counterclockwise direction for one quarter turn. It will be seen that the spacer ring 37 provides suitable clearance for the end of the stud in operating the fastener. It also closes off the end of the slots 34 so as to retain the locking pin 35 in place.

If a sealed type of installation is desired, a compressible gasket may be inserted between the removable panel 16 and the support 19.

Referring now to the modified preferred form of receptacle as shown in FIGS. 7–12, the stud assembly, consisting of the stud member 15, removable panel 16, and snap ring 17, may be the same as in the first form of my invention. The receptacle member 18' is assembled with a suitable support 19 by means of the same type of self-clinching press-in mounting formed around the lower end of cylindrical side wall 26' and consisting of the same type of shoulder 30 and serrated toothed ring 31 formed around the surface of the shoulder with adjacent groove 32 and rib 33. Cap 27' is secured over the top of the cylinrical side wall 18' and the lower end thereof is rolled or clinched into the groove 28 formed around the outside of the cylindrical wall near the center thereof as indicated at 29. Locking pin or bar 35 is similarly disposed inside the casing extending between the diametrically opposed slots 34' extending longitudinally of the side wall near but spaced from the upper end thereof. Helical spring 36 normally presses the locking pin or bar 35 towards the upper portion of the slots 34'.

Figure 12:
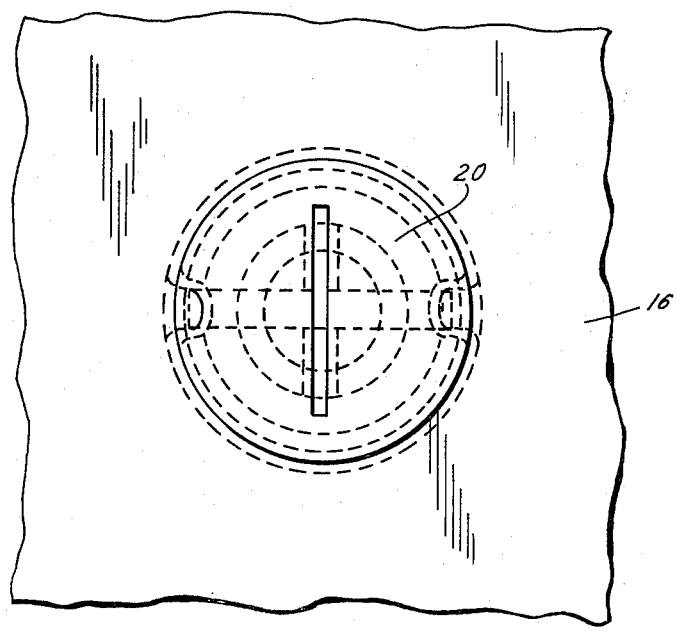

In the form of receptacle shown in FIGS. 7–12 the spacer ring 37 is eliminated. Instead, the outer end of the cylindrical wall 18' is extended upwardly a sufficient distance to provide the necessary clearance space as shown at 38. The upward extension 38 of the cylindrical side wall is provided with diametrically opposed enlarged openings 39 communicating directly with the slots 34'. The cap 27' is provided with diametrically opposed indentations 40 in the head portion thereof of a size to snugly fit into the openings 39 in the upward extension 38 of the cylindrical side wall. The indentations thus serve to position the cap and to close the upper end of the slots 34. The indentations also serve as a guide when installing the receptacle, as shown in FIG. 12, so that all of the receptacles in an assembly can be mounted in similar relative rotary position so that the screwdriver slot in the fastener studs will all be in the same relative position when the fasteners are locked.

In the first form of my invention, shown in FIGS. 1–6, markings may be made in the head of the cap of the receptacle in place of the indentations 40 so that all of the receptacles in an assembly may be mounted in the same relative rotary position.

The receptacle of FIGS. 8–12 is assembled with the support 19 in the same manner as the first form of my receptacle and when so assembled is firmly held in position against either rotation or release. The fastener stud is similarly engaged with the receptacle by inserting the end thereof through the aperture in the support into the receptacle until the spiral slot 24 is engaged with the locking pin 35. Rotation of the stud for one quarter turn in a clockwise direction will then cause the locking pin to ride inwardly in the spiral slot until it is locked behind the shoulder or cam. Rotation of the stud for one quarter turn in the opposite direction will disengage the fastener.

The modified receptacle 18' may be made of similar materials as that indicated for the first form of receptacle.

Modifications may be made in the illustrated embodiments of my invention without departing from the invention as set forth in the accompanying claims.

I claim:

1. An improved fastener receptacle which is useful in providing protection against dust, weather and radiofrequency leakage for use in a quick release fastener of the type having an interengageable fastener receptacle and fastener stud with the stud having a head and a dependent shank with a spiral cam slot formed with a locking shoulder extending inwardly from the lower end thereof, said fastener receptacle comprising:

an enclosing casing having a cylindrical side wall formed with a serrated toothed shoulder and a groove and rib immediately adjacent thereto providing a self-clinching press-in mounting at the inner end of the cylindrical wall, said casing having a sealing cap enclosing the outer end of the cylindrical wall;

and locking means engageable with the spiral cam slot of the stud disposed within the casing and shiftable longitudinally thereof and normally urged towards the upper end thereof by means of a helical spring disposed within the casing whereby the locking means may shift downwardly against the force exerted by the spring when it is engaged by the spiral cam slot of a fastener stud.

2. An improved fastener receptacle which is useful in providing protection against dust, weather and radiofrequency leakage for use in a quick release fastener of the type having an interengageable fastener receptacle and fastener stud with the stud having a head and a dependent shank with a spiral cam slot formed with a locking shoulder extending inwardly from the lower end thereof, said fastener receptacle comprising:

an enclosing metallic casing having a cylindrical side wall with a pair of diametrically opposed longitudinal extending slots formed therein near the outer end thereof and with a serrated toothed shoulder and a groove and rib immediately adjacent thereto providing a self-clinching press-in mounting at the inner end of the cylindrical wall, said casing having a sealing cap enclosing the outer end of the cylindrical wall and extending over the slots formed therein;

locking means having projecting portions disposed in the slots in the wall so as to be shiftable longitudinally of the slots when engaged by the spiral cam slot of a fastener stud;

and a helical spring disposed within the casing and extending between the shoulder in the side wall and the locking means to normally press the locking means toward the outer end of the slots whereby the locking means may shift downwardly in the slots against the force exerted by the spring when the locking means is engaged by the spiral cam slot of a fastener stud.

3. An improved fastener receptacle as set forth in claim 2 in which spacing means are provided between the top of the cap and the cylindrical side wall to provide clearance for the end of a fastener stud when it is rotated between locked and unlocked positions.

4. An improved fastener receptacle as set forth in claim 3 in which the slots in the cylindrical side wall extend to the upper end thereof and the spacing means consists of a ring disposed around the inside of the cap beyond the cylindrical wall so as to close the ends of the said slots.

5. An improved fastener receptacle as set forth in claim 2 in which the slots in the cylindrical side wall terminate in enlarged openings in the outer end of the wall and the top of the cap is formed with indentations which are disposed in the enlarged openings and close the end of the slots, the indentations serving as guides to indicate the rotary orientation of the receptacle.

6. A quick release fastener useful in providing protection against dust and weather and radiofrequency leakage which comprises:

(a) a spiral slot fastener stud having a head and a dependent shank with a spiral cam slot having a locking shoulder extending inwardly from the lower end thereof; and (b) a fastener receptacle for interengagement with the fastener stud and having
 (i) an enclosing metallic casing having a cylindrical side wall with a pair of diametrically opposed slots extending longitudinally near the outer end thereof and with a serrated toothed shoulder and a groove and rib immediately adjacent thereto providing a self-clinching press-in mounting at the inner end of the cylindrical wall, said casing having a sealing cap enclosing the outer end of the cylindrical wall and extending over the slots formed therein;
 (ii) a locking pin extending diametrically across the cylindrical wall with its ends disposed in the slots in the wall so as to be shiftable longitudinally of the slots when engaged by the spiral cam slot of the fastener stud;
 (iii) and a helical spring disposed within the casing and extending between the shoulder in the side wall and the locking pin to normally press the pin toward the outer end of the slots whereby the pin may shift downwardly in the slots against the force exerted by the spring when the pin is engaged by the spiral cam slot of the fastener stud.

* * * * *